March 30, 1965
G. WHITEHOUSE
3,175,844
TREADLE SCOOTER
Filed July 31, 1963
2 Sheets-Sheet 1
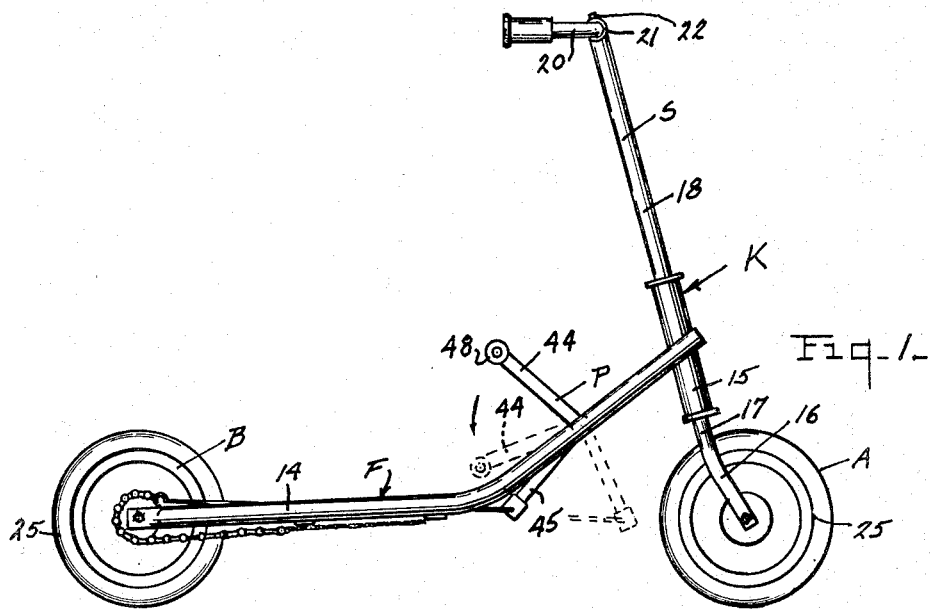
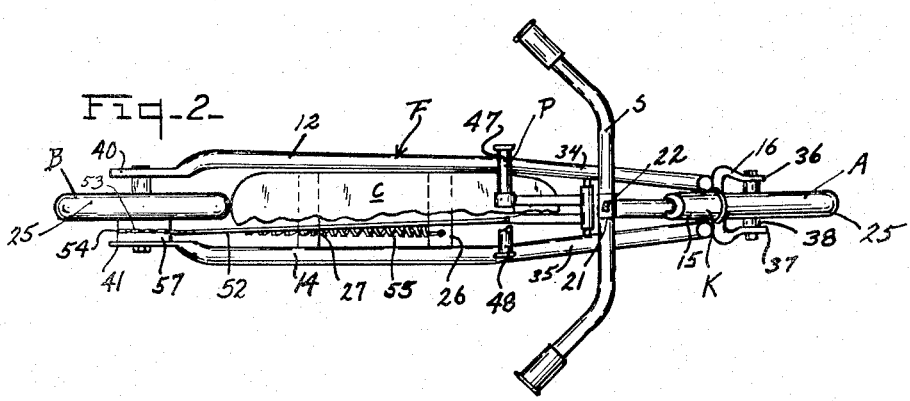
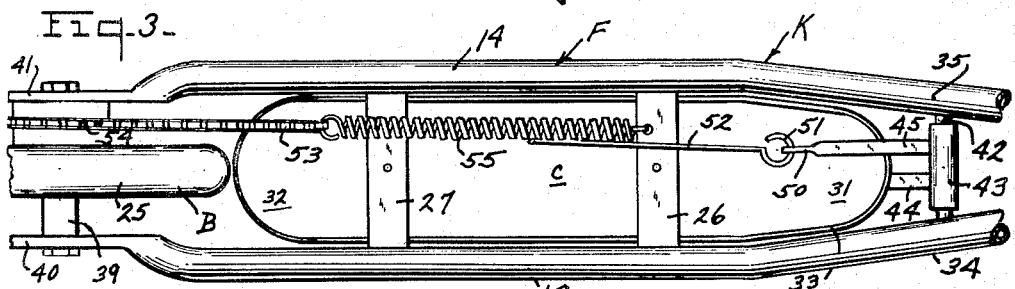
INVENTOR
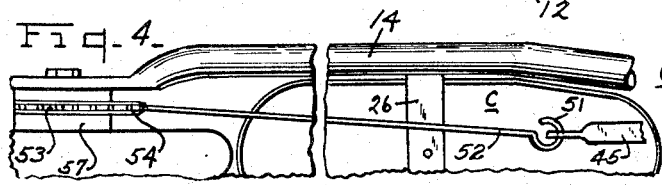
GEORGE WHITEHOUSE.

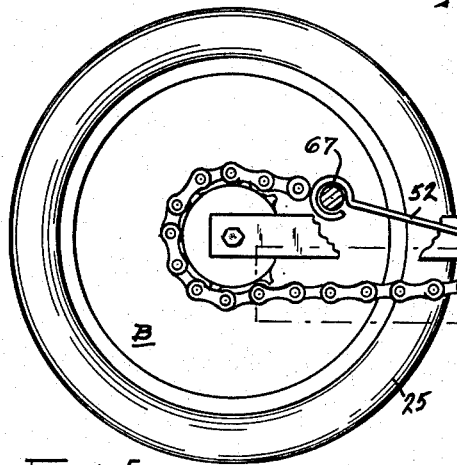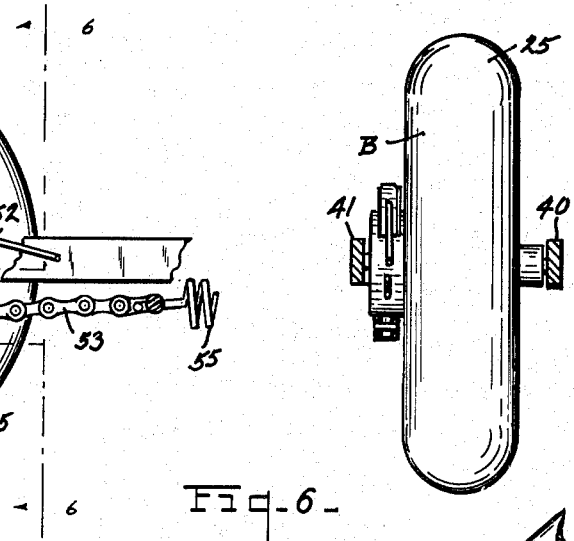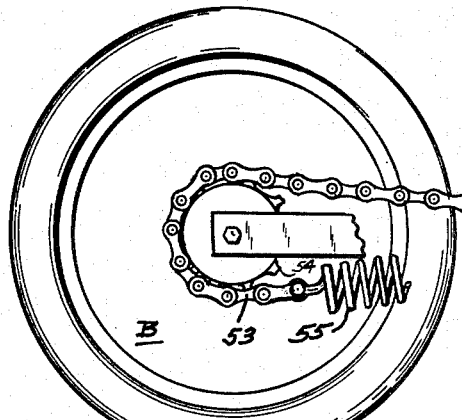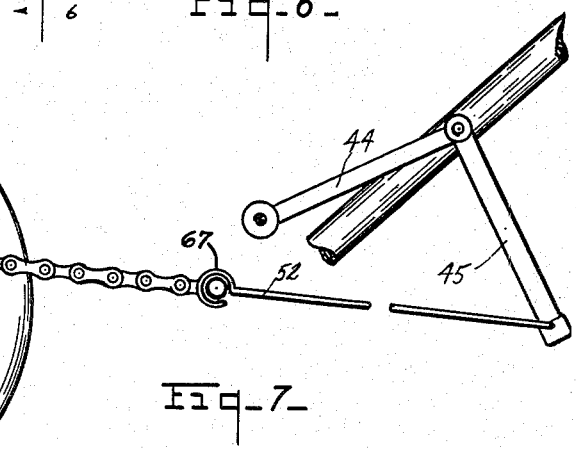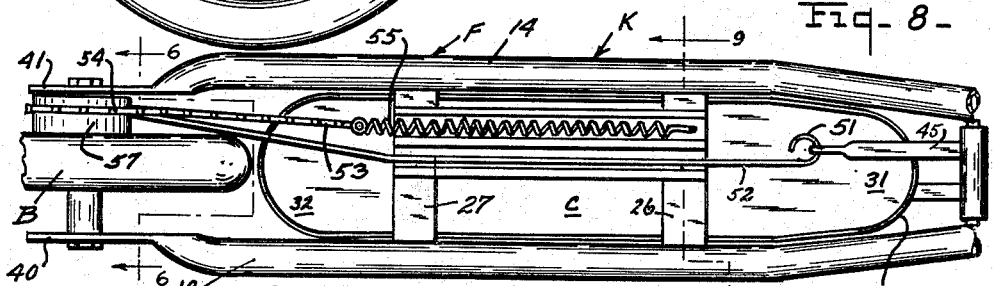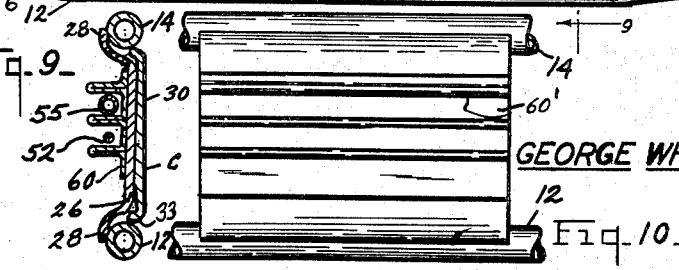
INVENTOR
*GEORGE WHITEHOUSE.*

3,175,844
TREADLE SCOOTER
George Whitehouse, 6309 N. Washtenaw Ave., Chicago 45, Ill.
Filed July 31, 1963, Ser. No. 298,918
6 Claims. (Cl. 280—221)

This invention relates to scooters and more particularly to an improved driving mechanism for treadle type scooters.

The primary object of the present invention is to provide a treadle type scooter which has an improved driving mechanism having a simple and sturdy construction which may be economically manufactured and assembled.

A further object of the invention is to provide a treadle type scooter embodying a platform supported on a frame having two wheels arranged one behind the other with the front wheel serving as a means for steering of the scooter; the child or person standing with one foot upon the platform and engages the treadle with the opposite foot for propelling the scooter forwardly, without necessarily pressing the foot upon the surface over which the scooter is moving.

A still further object of the invention is to provide a scooter with a frame and platform, with driving means so associated with the frame and platform and rear drivewheel, as to not interfere with the feet of the operator when standing upon the platform, and which driving means when in its inoperative position will permit of the scooter being propelled from the ground by either foot of the operator.

Another object of the invention resides in the provision of a child's scooter embodying a frame supporting a platform, the frame having a treadle means mounted between angular upright members thereof, the treadle means being connected with a draw rod which extends rearwardly to the forward end of the drive chain arranged upon the drive sprocket wheel carried on the drive wheel, the lower end portion of the drive chain being attached to a coil spring having one end thereof attached to the frame cross member extending beneath the platform.

And still another object of the invention is to provide a scooter with a platform substantially smooth on its upper surface and with longitudinal through portions upon the underside thereof for guiding the drawbar and coil spring of the driving mechanism and preventing contact of the same with each other.

These and other objects of the present invention will be fully apparent from the following description when taken in connection with the annexed drawings.

In the drawings wherein like numerals of reference designate corresponding parts throughout the several views, in which:

FIGURE 1 is a side elevation of a child's vehicle, or scooter, constructed in accordance with my invention and showing certain portions in dotted lines for purpose of clarification;

FIGURE 2 is a plan view of the scooter shown in FIGURE 1, certain parts broken away for purpose of clarification;

FIGURE 3 is a fragmentary bottom plan view of the frame and platform assembled thereto with the draw rod and coil spring in normal position;

FIGURE 4 is a fragmentary bottom plan view of the frame and platform with the draw rod shown connected to the one end of the drive chain, the coil spring being omitted for purpose of clarification;

FIGURE 5 is a fragmentary, enlarged side view of the driving wheel with the chain, draw rod and coil spring in normal position;

FIGURE 6 is an end view partially in cross section taken along lines 6—6 shown in FIGURES 5 and 8;

FIGURE 7 is a fragmentary, enlarged side view of the driving wheel with the driving chain drawn forwardly and the coil spring in extended position;

FIGURE 8 is a fragmentary bottom plan view showing a modified form of a scooter with the platform and a guide plate beneath it with through portions having draw rod and coil spring arranged therein;

FIGURE 9 is a cross-sectional view taken substantially on line 9—9 of FIGURE 8, and FIGURE 10 is a fragmentary, enlarged bottom plan view of a modified guide plate.

Referring to the drawings in detail, and wherein similar reference characters designate corresponding parts throughout the several views, the letter F designates the frame of the scooter K, mounted between and upon front and rear ground engaging wheels A and B respectively, with the front wheel A capable of being turned for guiding the scooter as by the steering means S; and P a propelling means operatively connected with the rear wheel B whereby the scooter may be propelled by a person standing upon the platform C secured to cross members of the frame F.

The frame F comprises a pair of metal bars 12 and 14 extending longitudinally along the opposite sides of the scooter K, and the forward ends of which are inclined upwardly and forwardly and secured by welding, or the like to the sleeve 15. The front wheel A is rotatably mounted in a fork 16 having an upwardly extending tubular shaft 17 journalled in the sleeve 15. A handle bar supporting shaft 18 is received in the upper end of the tubular shaft 17. A bicycle type handle bar 20 is mounted in a cross-clamp provided on the upper end of the shaft 18, the cross-clamp 21 may be loosened to permit the handle bar 20 to be pivoted to any desired position by adjusting locking nut 22 arranged therewith. This construction permits the handle bar to be adjusted to the proper position for riders of widely different sizes.

The wheels A and B are preferably of the same diameter and may be provided with rubber tires 25.

The metal bars 12 and 14 are rigidly held in horizontally arranged position by cross members 26 and 27 extending therebetween and having downwardly extending ends 28 welded to the lower side walls of the bars 12 and 14, see FIGURE 9.

The platform C embodies a foot engaging surface with semi-circular end portions 31 and 32 and a peripheral depending rim 33, see FIGURE 8, which is preferably formed of sheet metal stock and upon which the operator stands with one foot while operating the propelling means P with the opposite foot. The extreme rear end arms 40 and 41 of the longitudinally arranged bars 12 and 14 are pressed into rectangular cross-section, and which arms are provided with suitable bores for receiving the rear axle 39 of the rear wheel B. The arms 40 and 41 are adapted to mount the rear wheel B at the longitudinal center of the platform C as clearly shown by FIGURE 2. The axle 39 is rigidly mounted and the wheel B is rotatable upon bearings arranged on the axle 39. The forward ends of the bars 12 and 14 are welded to the sleeve 15 as stated above and the fork 16 is rotatably mounted therein. The lower end portions 36 and 37 of the fork 16 are provided with bores through which extends the axle 38 of the front wheel A. The axle 38 is rigidly mounted, the wheel A being rotatable upon bearings arranged on the axle 38.

The forwardly and inwardly projecting end portions 34 and 35 of bars 12 and 14 have a rigid shaft 42 or cross bar fixed therebetween by welding, forming a pivot shaft for the tubular sleeve 43 arranged thereon. The said sleeve 43 has arms 44 and 45 rigidly secured thereto in spaced relation and at approximately ninety degrees relative to each other. The arm 44 extends normally upwardly and rearwardly from the sleeve 43 with a cross-bar mounted thereon and extending transversely and horizontally relative to the platform C forming foot rests 47 and 48 to provide means by which a person standing on the platform C may pump the arm 44 downwardly. The arm 45 normally extending downwardly and rearwardly will be moved forwardly when the arm 44 is moved downwardly; the arm 45 will be provided with flattened portion 50 with a bore therethrough which receives the circular end 51 of drawbar 52, the circular rear end 67 of drawbar 52 being fixed to one end of the chain 53, as shown by FIGURE 4. The chain 53 is arranged over and upon the drive sprocket 54 with its lower and opposite end attached to the rear end of coil spring 55 which itself is attached at its forward end to cross bar 26. Whereby, the forward movement of arm 45 will move drawbar 52 forwardly, the chain will produce rotation of sprocket 54 and expansion of coil spring 55 which keeps the proper tension in the chain 53. In use, a child may pump the treadle, or foot rests 47 and 48 downwardly. During the execution of its downward movement the treadle drives the rear wheel B to propel the scooter and the spring 55 will return the treadle to its upward position for the next pumping motion by the person, the overriding clutch 57, with its assembly of movable parts, permitting free wheeling between driving strokes of the treadle.

Forward and rearward action, of the arm 45 substantially at the longitudinal center of the platform C, the arm being normally held in rearward position by spring action transmitted through the chain and draw-bar, will permit the operator to readily place either foot upon the ground for righting of the scooter, or permit both feet to be placed upon the platform when coasting, riding or gliding downhill or the like.

The rear end of the drawbar 52 extends upwardly and rearwardly and has circular end 67 connected with one end of chain 53. The rear end of the coil spring 55 extends downwardly and rearwardly to connect with the opposite end of the chain 53. In order to provide through shaped passageways for the drawbar and coil spring to keep them from contacting each other during action of the treadle, an improvement is added to FIGURES 1–7 in the form of a plate 60 with depending walls, W-shape in cross-section, see FIGURES 8 and 9. The plate 60 is arranged below and secured to said cross members 26 and 27 and is therefore a novel means of protecting the coil-spring while expending and extending rearwardly while the drawbar moves forwardly. The modified plate 60' shown in FIGURE 10 extends between the sides, 12, 14.

By observing FIGURES 1 and 2, it will be seen that the operator may readily place the left foot on the platform C and pump the treadle with the right foot; or if desired the operator may place the right foot on the platform C pump the treadle with the left foot. Because the arm 44 is offset with respect to the arm 45, and the arms are arranged on opposite sides of the longitudinal center of the platform as well as being formed ninety degrees apart at the sleeve 43, the draw bar, or draw-rod will always travel in one trough while the coil-spring will always travel in the second trough formed by the depending walls of said W-shaped plate 60. Since the sleeve 43 pivots on shaft 42 which is arranged in a transverse plane elevated above the platform and between the end portions 34 and 35 of frame F, the likelihood of the treadle becoming broken or struck by the foot of the operator, is limited to a minimum.

From the foregoing description it will be apparent that an improved and novel construction for scooters has been provided embodying a propelling means consisting of but very few operating parts and which propelling means will permit of the scooter being driven by means of an operator standing upon the scooter. It will also be apparent that the construction also permits of the operator to readily place either foot upon the platform while pumping with the opposite foot, or placing both feet upon the platform while coasting or gliding.

Change in detail may be made to the specific form of the invention herein shown and described, without departing from the spirit of the invention or the scope of the following claims.

I claim as my invention:

1. A treadle operated scooter comprising a frame embodying a pair of longitudinal frame members, a plurality of cross members and a platform secured to said cross members, steering and driving wheels mounted respectively and in alignment forwardly and rearwardly of the platform, a treadle pivotally assembled at its forward body portion to a cross bar forming a part of said frame, a draw rod having a central portion and circular end portions connected at its forward circular end portion to the treadle and extending rearwardly therefrom below said platform and one end of a chain means connecting the said circular rear end portion of the said draw rod with an overriding clutch assembled with the drive wheel for forward turning of the drive wheel upon depression of the treadle, and a coil spring connected at its rear, to the opposite end of said chain means and extending forwardly therefrom below said platform, the forward end of said coil spring being connected to one of said cross members of said frame extending transversely thereof and below said platform.

2. A treadle operated scooter comprising a frame embodying a pair of longitudinal frame members, a plurality of cross members and a platform secured to said cross members, steering and driving wheels mounted respectively and in alignment forwardly and rearwardly of the platform, a treadle embodying a cylindrical sleeve portion and two outwardly extending arms pivotally assembled with its sleeve portion upon a bearing shaft extending transversely of said frame and forming an integral part thereof, one of said arms extending rearwardly and upwardly from said sleeve and having a foot rest secured to the upper end thereof, the second arm extending downwardly and rearwardly from said sleeve and having a lower free end thereof, a draw rod embodying circular end portions and connected at its forward circular end portion to the lower free end of said second arm and extending rearwardly therefrom below said platform, a jointed chain means assembled over a sprocket, said sprocket assembled with an overriding clutch assembled with the drive wheel, one end of said chain means connecting the said circular rear end portion of the said draw rod with the sprocket for forward turning of the drive wheel upon depression of the foot rest effecting pivoting action of said arms of said treadle, and a coil spring connected at its rear end to the opposite end of said chain means and extending forwardly therefrom and below said platform, the forward end of said coil spring being connected to one of said cross members of said frame extending transversely thereof and below the forward portion of said platform.

3. The device described in claim 2, wherein said platform extends entirely transversely of said frame and is rigidly secured to said cross members, and a plate embodying depending walls secured to said members and assembled beneath said platform, said plate being W-shaped in cross-section and forming two longitudinal troughs for guiding said draw rod and said coil spring therein and separate from each other.

4. A child's scooter comprising a tubular metal frame embodying a pair of longitudinal members spaced apart from each other by cross members and a cross bar and supporting a tubular sleeve extending upwardly and rearwardly relative to said longitudinal members, steering and driving wheels mounted respective and in alignment forwardly and rearwardly of said frame, a fork assembled with said steering wheel and rotatably mounted in said tubular sleeve and connected with the lower end of a steering shaft supporting a handle bar means upon its upper end, a platform secured to said cross members and extending transversely and longitudinally between said longitudinal members, the forward end portions of said longitudinal members extending angularly upwardly and inwardly towards each other and welded to said tubular sleeve at the forward ends thereof, said cross bar secured between said forward end portions of said longitudinal members midway between said platform and said sleeve, a treadle embodying a pivoting sleeve and two arms mounted with its pivoting sleeve upon said cross bar, a draw rod having a central portion and circular end portions connected with its circular forward end portion to one of said arms of said treadle, said one arm extending downwardly from said sleeve, the second arm of said treadle extending upwardly and rearwardly and supporting a foot rest thereon, said draw rod extending rearwardly, one end of a chain means connecting the circular rear end portion of the said draw rod with a sprocket assembled with an overriding clutch forming a part of said drive wheel for imparting a forward turning to the driving wheel upon depressing of the treadle, and a coil spring connected at its rear end to the opposite end of said chain means and extending forwardly therefrom and below said platform, the forward end of said coil spring being connected to one of said cross members spaced between said longitudinal members and below the said platform supported by said cross members.

5. A child's scooter type vehicle comprising a metal frame embodying cross members with a metal platform secured to said cross members, steering and drive wheels mounted respectively and in alignment one behind the other forwardly and rearwardly of the metal platform, a sprocket and overriding clutch assembled with the hub portion of said driving wheel, a jointed chain means arranged over said sprocket with both its ends extending forwardly and above the other, a treadle pivotally carried by the metal frame ahead of said platform, said treadle having two arms angularly positioned relative to each other, one arm extending upwardly and rearwardly and supporting a foot rest, the second arm extending downwardly and rearwardly and having an eye arranged in its free end portion, a draw rod having circular end portions connected at its forward circular end portion with the eye of said second arm and extending below said platforms and rearwardly with its circular rear end portion arranged at the rear of said platform and connected with the top end of said chain means for imparting a forward turning to the driving wheel, upon depressing of the treadle, a coil spring connected at its rear end to the opposite lower end of said chain means and extending forwardly therefrom and below said platform, the forward end of said coil spring being connected to one of said cross members of said frame below said platform, and a metal plate embodying depending walls that are W-shaped in cross-section to form a pair of troughs for guiding the central portion of said draw rod and said spring therein and separate from each other.

6. A treadle operated scooter comprising an upright frame embodying a horizontal central portion with cross members, a rear portion and an upwardly projecting tubular sleeve member, a two prong fork depending from said sleeve member and also connected with a steering shaft extending from and above said sleeve member, a rotatable front wheel positioned between and carried by said prongs of said fork, said rear end portion of said frame including a pair of flattened free ends disposed in side by side spaced relation, a driveable rear wheel positioned between and carried by said free ends, a platform carried by the cross members of said horizontal central portion of said frame in alignment with the centers of said front and rear wheels, a treadle disposed in superimposed spaced relation with respect to said central portion of said frame and pivotally connected to the forward portion of said frame for upward and downward movements about a horizontal axis, an arm extending downwardly from said treadle, a draw rod having circular ends with one end pivotally connected with the lower end of said arm, the opposite end of said draw rod connected to one end of a piece of chain arranged over and around a sprocket connected with a free wheeling clutch for driving the rear wheel upon execution of said treadle downwardly, and a coil spring connected between the opposite end of said chain means and one of said cross members of said frame biasing said treadle to its upward position.

References Cited by the Examiner

UNITED STATES PATENTS

| 2,468,910 | 5/49 | Zsinor et al. | 280—87.04 |
| 2,486,689 | 11/49 | Tibores et al. | 280—87.04 |
| 2,861,814 | 11/58 | Rebhun | 280—243 |

FOREIGN PATENTS

| 686,320 | 4/30 | France. |
| 1,028,408 | 2/53 | France. |

MILTON BUCHLER, *Primary Examiner.*

KENNETH H. BETTS, A. HARRY LEVY, *Examiners.*